US011117816B2

(12) United States Patent
Vagasky

(10) Patent No.: US 11,117,816 B2
(45) Date of Patent: Sep. 14, 2021

(54) WATER DISINFECTING MODULE, SYSTEMS AND METHODS

(71) Applicant: David Vagasky, Elgin, IL (US)

(72) Inventor: David Vagasky, Elgin, IL (US)

(73) Assignee: GEBERIT INTERNATIONAL AG, Jona (CH)

( * ) Notice: Subject to any disclaimer, the term of this patent is extended or adjusted under 35 U.S.C. 154(b) by 0 days.

(21) Appl. No.: 16/528,299

(22) Filed: Jul. 31, 2019

(65) Prior Publication Data

US 2020/0048112 A1 Feb. 13, 2020

Related U.S. Application Data

(60) Provisional application No. 62/848,299, filed on May 15, 2019, provisional application No. 62/718,238, filed on Aug. 13, 2018.

(51) Int. Cl.
*C02F 1/32* (2006.01)
*E03C 1/04* (2006.01)
*C02F 1/00* (2006.01)

(52) U.S. Cl.
CPC .............. *C02F 1/325* (2013.01); *C02F 1/008* (2013.01); *E03C 1/04* (2013.01); *C02F 2201/326* (2013.01); *C02F 2209/40* (2013.01); *C02F 2303/04* (2013.01)

(58) Field of Classification Search
None
See application file for complete search history.

(56) References Cited

U.S. PATENT DOCUMENTS

| 5,451,791 | A | * | 9/1995 | Mark | A61L 2/10 250/435 |
| 10,500,295 | B2 | | 12/2019 | Pagan et al. | |
| 10,814,024 | B2 | | 10/2020 | Pagan et al. | |
| 10,894,726 | B1 | * | 1/2021 | Pugh | C02F 1/325 |
| 2007/0119758 | A1 | * | 5/2007 | Duplessis | C02F 9/005 210/85 |
| 2016/0214041 | A1 | * | 7/2016 | Miller | E03C 1/055 |
| 2019/0046675 | A1 | | 2/2019 | Pagan et al. | |
| 2020/0069825 | A1 | | 3/2020 | Pagan et al. | |

FOREIGN PATENT DOCUMENTS

WO 2019032943 A1 2/2019

* cited by examiner

*Primary Examiner* — Richard C Gurtowski
(74) *Attorney, Agent, or Firm* — Polsinelli PC; Elton F. Dean, III, Esq.

(57) ABSTRACT

Water disinfecting modules, water supply systems, methods of assembling a water supply system as well as method of disinfecting water are provided. The water disinfecting module includes a frame, hot and cold water flow switches and hot and cold UV treatment modules is provided. The frame supports a hot and cold water inlets and hot and cold water outlets. Hot and cold water flow switches are fluidly interposed between the respective inlets and outlets for sensing water flow. Hot and cold water UV treatment modules are fluidly interposed between corresponding inlets and outlets and are coupled to flow switches for activation upon sensing of water flow. All of the components are supported by the frame to form a complete unit. The systems and methods incorporate the use of such a water disinfecting module.

13 Claims, 6 Drawing Sheets

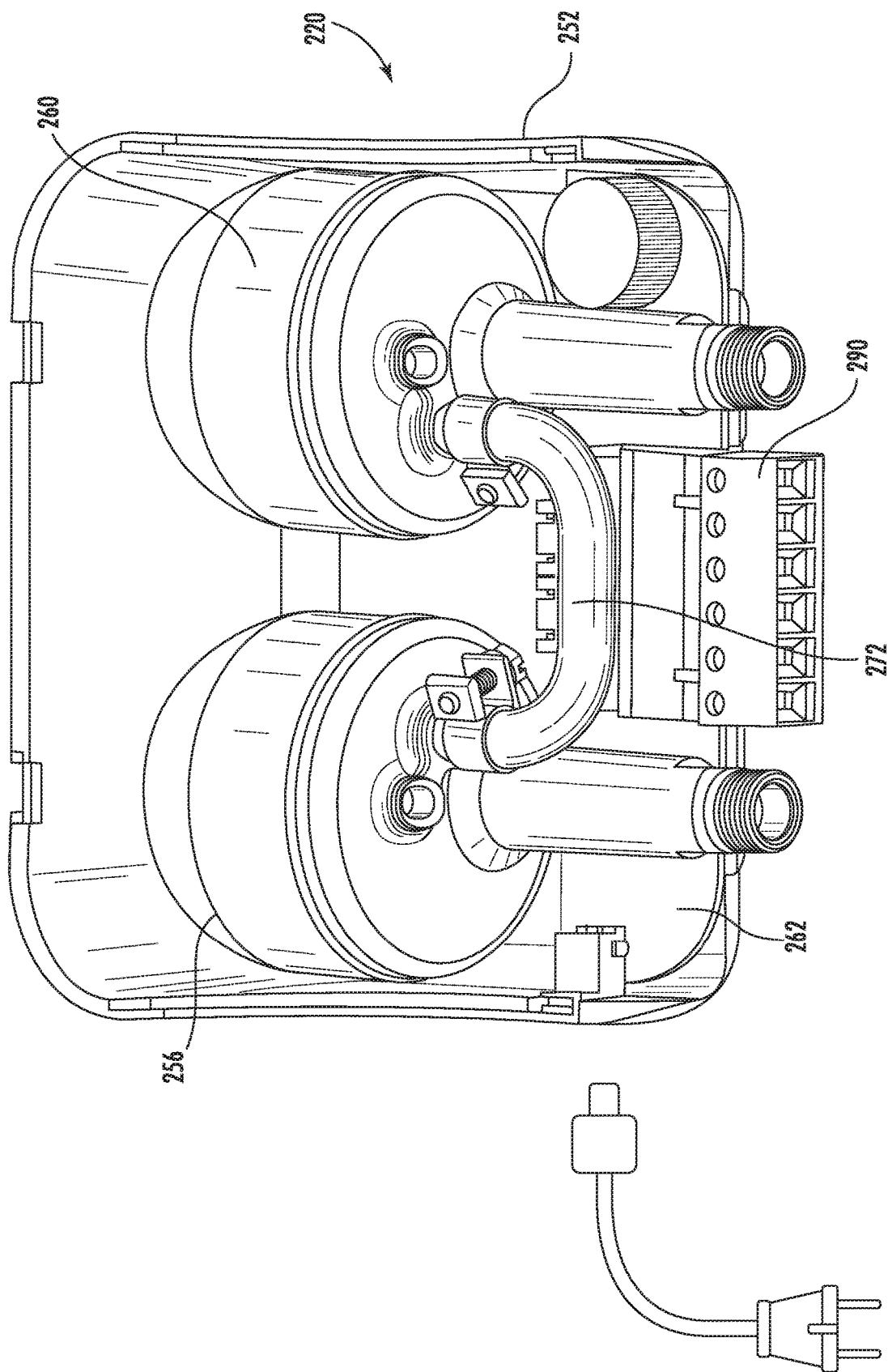

WATER DISINFECTING MODULE, SYSTEMS AND METHODS

CROSS-REFERENCE TO RELATED PATENT APPLICATIONS

This patent application claims the benefit of U.S. Provisional Patent Application No. 62/718,238, filed Aug. 13, 2018, and U.S. Provisional Patent Application No. 62/848,299, filed May 15, 2019, the entire teachings and disclosure of which are incorporated herein by reference thereto.

FIELD OF THE INVENTION

This invention generally relates to water disinfecting devices for installation at a point of use.

BACKGROUND OF THE INVENTION

Healthcare Associated Infections (HAIs) are a growing concern in healthcare facilities. *Legionella Pneumophila*, *Pseudomonas Aeruginosa*, and *Escherichia Coli* are among a number of water borne pathogens that cause HAIs, leading to longer patient stays and higher medical costs.

Controlling the organisms in the water system before exposing patients and healthcare workers should lead to a reduction of HAIs. When organisms are exposed to sufficient amounts of Short Wavelength Ultraviolet Light (UV-C), their DNA is disrupted leaving them unable to perform vital cellular functions, thus disinfecting the water.

While it may be easy to include water disinfecting devices in new construction, it is more difficult and time consuming to implement water disinfecting devices in existing healthcare facilities. For example, most water supply arrangements, e.g. faucets, are mounted to a counter adjacent a sink. However, there may be limited places to mount or install a disinfecting device below the counter in existing facilities. Further, there may be limited access to electricity.

Further, some options for disinfecting water are applied where the water comes into the facility which is typically remote from the faucet where the water is dispensed such that there is a significant amount of piping between where the water is disinfected and then ultimately dispensed, e.g. the faucet.

Therefore, there is a need in the art to provide for simple and easy retrofit options for disinfecting water as well as for disinfecting the water close to the point of use. Embodiments of the present invention are aimed at rectifying one or more of these issues.

BRIEF SUMMARY OF THE INVENTION

Embodiments of the present invention provide new and improved water disinfecting modules, water supply systems incorporating water disinfecting modules, methods of assembling a water supply system as well as method of disinfecting water.

In a particular embodiment, a water disinfecting module including a frame, hot and cold water flow switches and hot and cold UV treatment modules is provided. The frame supports a hot water inlet, a hot water outlet, a cold water inlet and a cold water outlet. The hot water flow switch is fluidly interposed between the hot water inlet and hot water outlet sensing a hot water flow from the hot water inlet to the hot water outlet. The hot water flow switch is supported by the frame. The hot water UV treatment module is fluidly interposed between the hot water inlet and hot water outlet. The hot water UV treatment module is operably coupled to the hot water flow switch for activation of the hot water UV treatment module upon sensing of the hot water flow. The hot water UV treatment module is supported by the frame. The cold water flow switch is fluidly interposed between the cold water inlet and cold water outlet sensing a cold water flow from the cold water inlet to the cold water outlet. The cold water flow switch is supported by the frame. The cold water UV treatment module is fluidly interposed between the cold water inlet and cold water outlet. The cold water UV treatment module is operably coupled to the cold water flow switch for activation of the cold water UV treatment module upon sensing of the cold water flow. The cold water UV treatment module supported by the frame.

In a particular embodiment, the frame is a housing having an internal cavity with the hot and cold water flow switches and hot and cold water UV treatment modules being located within the internal cavity.

In a particular embodiment, a controller operably couples the hot water flow switch with the hot water UV treatment module to activate the hot water UV treatment module upon sensing the flow of hot water. The controller operably couples the cold water flow switch with the cold water UV treatment module to activate the cold water UV treatment module upon sensing the flow of cold water. The controller is supported by the housing and located within the internal cavity.

In a particular embodiment, a cold water flow path extends between the cold water inlet and cold water outlet. A hot water flow path extends between the hot water inlet and hot water outlet. The embodiment further includes a cold water cooling block adjacent the hot water UV treatment module for cooling UV LEDS within the UV treatment module. The embodiment includes a cold water bleed line fluidly connecting the cold water flow path with the cold water cooling block such that a portion of the cold water flow is supplied to the cold water cooling block. The cold water cooling block is fluidly connected to the hot water flow path such that after the portion of cold water passes through the cold water bleed line and the cold water cooling block, the water flows into the hot water flow path. The bleed line is located within the housing and/or supported by the frame.

In a particular embodiment, the cold water cooling block is fluidly connected to the hot water flow path upstream of the hot water UV treatment module such that the portion of the cold water flow that passes through the cold water cooling block mixes with the hot water flow prior to passing through the hot water UV treatment module.

In one embodiment, a check valve prevents hot water from flowing from the hot water flow path through the cold water bleed line to the cold water flow path.

In one embodiment, a single power supply cable passing into the internal cavity of the housing, power for powering the hot and cold water UV treatment modules being operably provided by the single power supply cable.

In one embodiment, the housing, hot and cold water flow switches, hot and cold water UV treatment modules and power supply cable are a self-contained and unitary unit.

In one embodiment, at least one LED indicator that can be selectively activated to provide an operational state of the water disinfecting module.

In a further embodiment, a water supply arrangement including a water disinfecting module as outlined above is provided. The water supply arrangement further includes a faucet. The faucet includes: a faucet cold water inlet operably coupled to the cold water outlet of the water disinfecting module; a faucet hot water inlet operably coupled to the hot water outlet of the water disinfecting module; a faucet outlet operably fluidly connected to the faucet hot and cold water inlets; and one or more valves operably interposed between the faucet cold water inlet, faucet hot water inlet, and faucet outlet for controlling the flows of hot and cold water from the faucet cold and hot water inlets to the faucet outlet.

In a further embodiment, a method of assembling the water supply arrangement is provided. The method includes providing a water disinfecting module in a fully assembled state, prior to performing the following steps: connecting the faucet cold water inlet operably to the cold water outlet of the unit; connecting the faucet hot water inlet operably to the hot water outlet of the unit; connecting a supply of hot water to the hot water inlet of the unit; and connecting a supply of cold water to the cold water inlet of the unit.

In a more particular method, the method includes simultaneously mounting the hot and cold water flow switches, hot and cold UV treatment modules to a support structure by mounting the frame to the support structure.

Further, methods of disinfecting water by retrofitting an existing water supply arrangement with a water disinfecting module as outlined above are provided.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 6-8 illustrate a further embodiment of a water disinfecting module.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
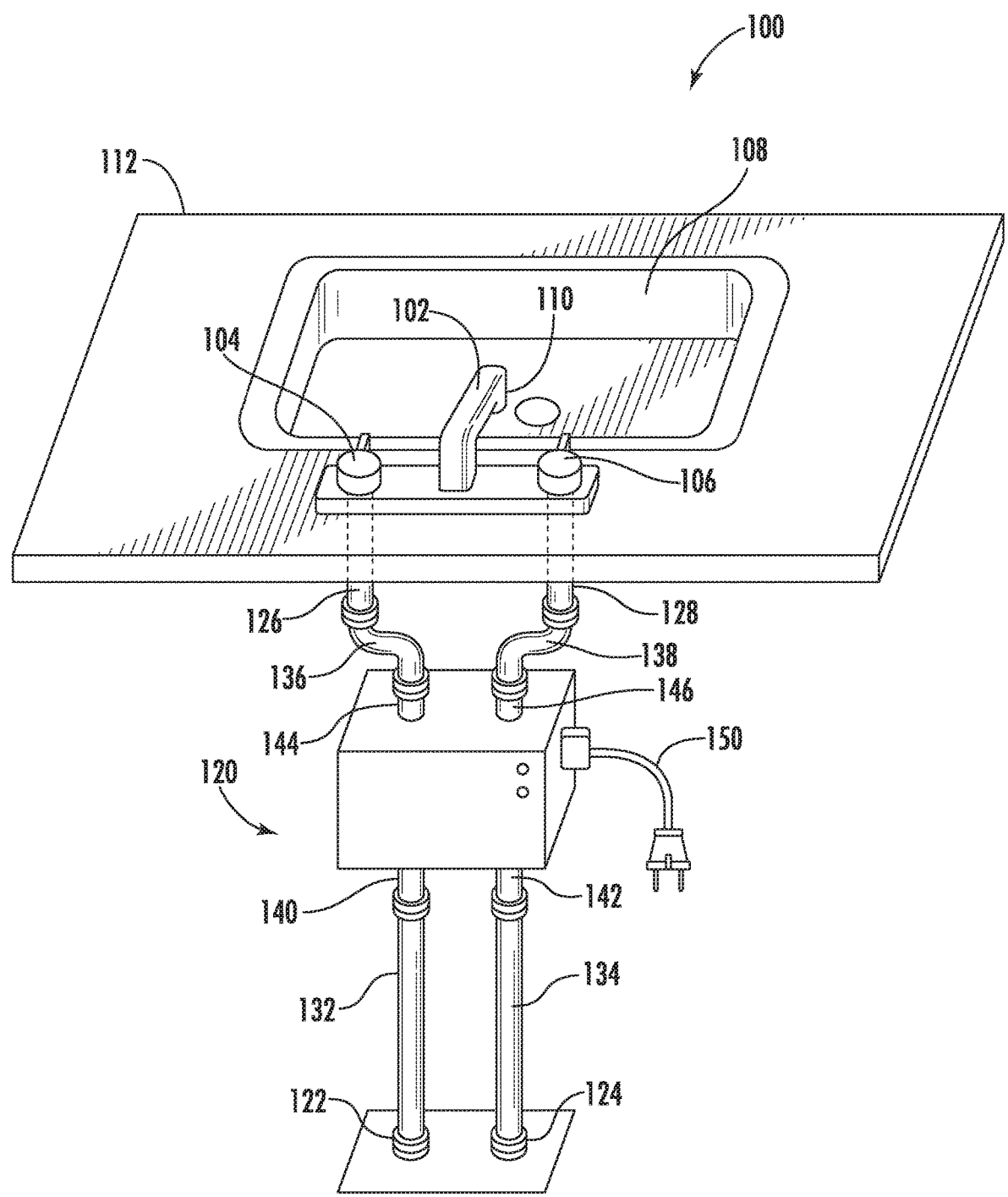
FIG. 1 is a simplified illustration of a water supply arrangement incorporating a water disinfecting module according to the teachings of an embodiment of the invention.

FIG. 1 is a water supply arrangement 100 that includes a faucet 102 used to dispense water. The faucet 102 includes cold and hot water control valves 104, 106 for controlling the flow of water out of the faucet 102 as well as the mixture of hot and cold water such that a desired temperature of water can be provided. In this embodiment, a sink 108 is below the outlet 110 of the faucet 102. The sink 108 and faucet 102 are operably mounted or supported to a counter 112.

The water supply arrangement 100 includes a water disinfecting module 120 interposed between the faucet and hot and cold water supplies. More particularly, cold and hot water stops 122, 124 that supply cold and hot water, respectively are operably fluidly connected to cold and hot water inlets 126, 128 of the faucet by the water disinfecting module 120 and a plurality of hoses 132, 134, 136, 138.

The disinfecting module 120 includes cold and hot water inlets 140, 142 and cold and hot water outlets 144, 146. Hoses 132, 134, 136, 138 are operably interposed between the various inlets and outlets such that a supply of cold water and a supply of hot water is provided to the faucet 102.

The water disinfecting module 120 also includes a single power supply cable 150 for operably connecting the water disinfecting module 120 to a source of electricity (not shown).

Figure 2:
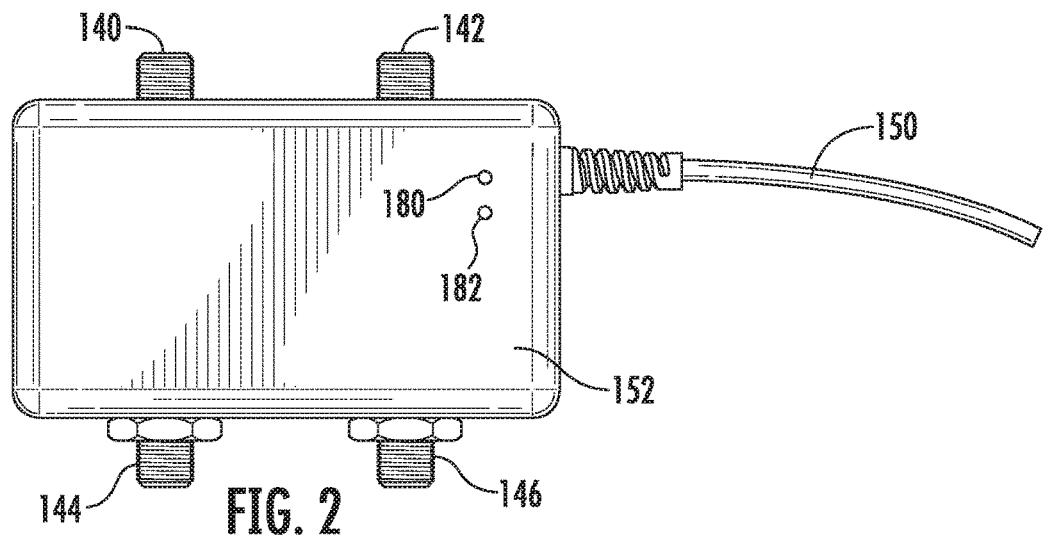
FIGS. 2-4 are illustrations of the water disinfecting module of FIG. 1.
Figure 3:
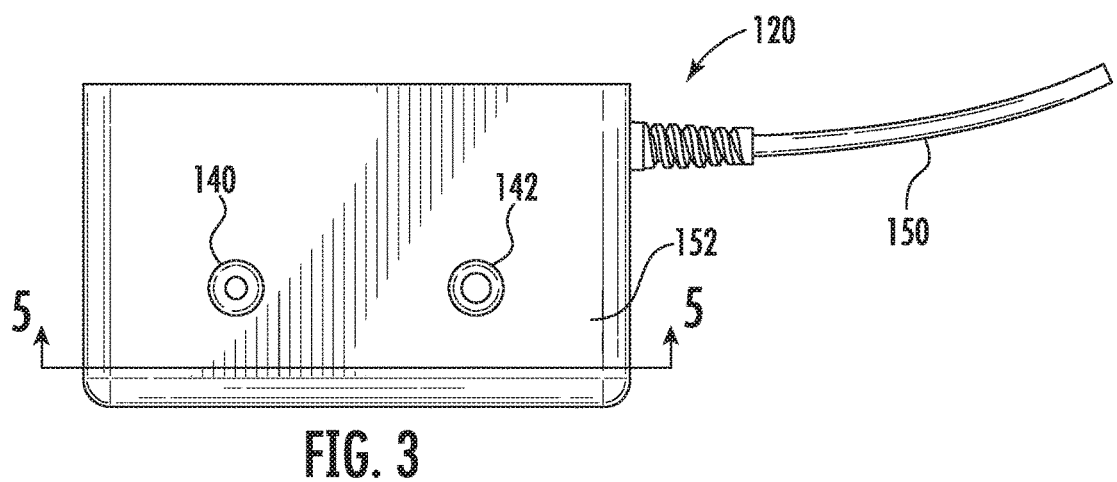
Figure 4:
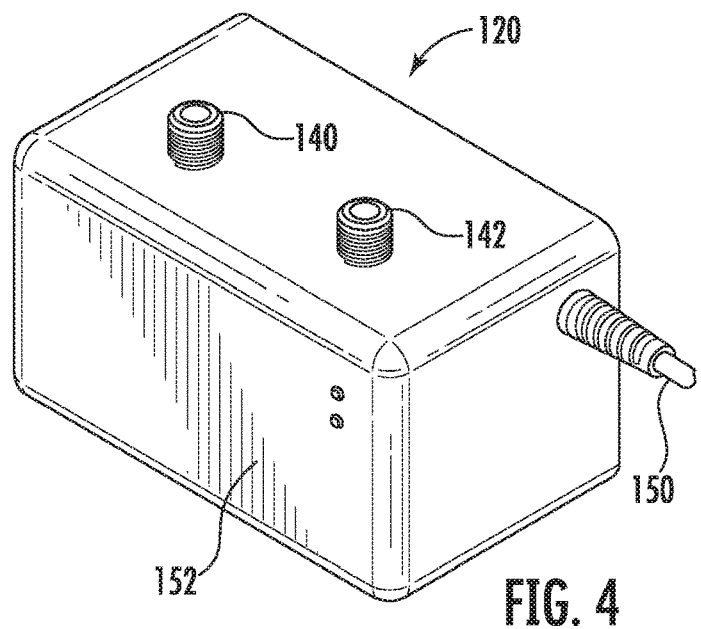

FIGS. 2-4 illustrate the water disinfecting module 120 in more detail. With principle reference to FIG. 2, the cold and hot water inlets 140, 142 and cold and hot water outlets 144, 146 are preferably provided by connectors that can be easily connected to hoses 132, 134, 136, 138. In the illustrated embodiment, the connectors are provided by threaded connectors. The inlets 140, 142 and outlets 144, 146 extend out of a housing 152 that acts as a frame for supporting the additional components of the water disinfecting module 120.

Figure 5:
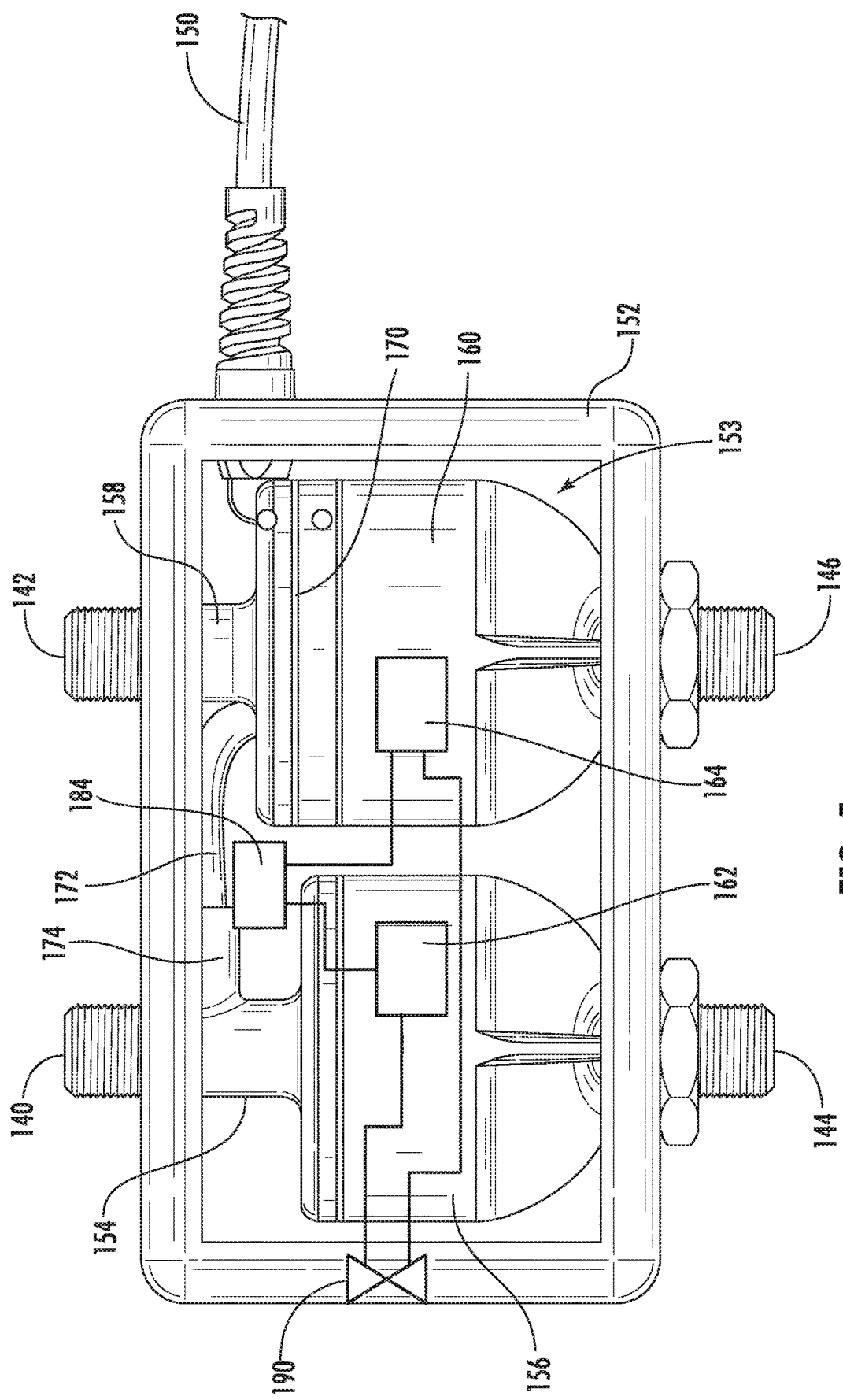
FIG. 5 is a cross-sectional illustration of the water disinfecting module of FIGS. 2-4.

With reference to FIG. 5, a cross-sectional illustration of the water disinfecting module 120 is illustrated and the internal cavity 153 of the housing 152 and component housed and supported therein are illustrated.

A cold water flow switch 154 is fluidly interposed between the cold water inlet 140 and cold water outlet 144 that senses a cold water flow from the cold water inlet 140 to the cold water outlet 144. The flow of cold water passes through a cold water UV treatment module 156 fluidly interposed between the cold water inlet 140 and cold water outlet 144 as the cold water flows therebetween. The cold water UV treatment module 156 is operably coupled to the cold water flow switch 154 for activation of the cold water UV treatment module upon sensing of the cold water flow. The cold water inlet 140, cold water flow switch 154, cold water UV treatment module 156 and the cold water outlet 144 define a cold water flow path through the water disinfecting module 120.

Similarly, a hot water flow switch 158 is fluidly interposed between the hot water inlet 142 and hot water outlet 146 that senses a hot water flow from the hot water inlet 142 to the hot water outlet 146. The flow of hot water passes through a hot water UV treatment module 160 fluidly interposed between the hot water inlet 142 and hot water outlet 146 as the hot water flows therebetween. The hot water UV treatment module 160 is operably coupled to the hot water flow switch 158 for activation of the hot water UV treatment module 160 upon sensing of the hot water flow. The hot water inlet 142, hot water flow switch 158, hot water UV treatment module 160 and the hot water outlet 146 define a hot water flow path through the water disinfecting module 120.

When activated and with water flowing therethrough, each UV treatment module 156, 160 exposes the corresponding flow of water to sufficient amounts of Short Wavelength Ultraviolet Light (UV-C) to disinfect the water prior to the water exiting the water disinfecting module 120. In one embodiment, the UV-C is produced by one or more light emitting diodes (LEDs) positioned within the outer case of the UV treatment module 156, 160. In one embodiment, each UV treatment module 156, 160 has a controller 162, 164 that controls the activation of the UV treatment module 156, 160 by receiving the signal indicating water flow from the corresponding water flow switch 154, 158. Each of the controllers 162, 164 would be connected to the single power supply cable 150 such that both UV treatment modules 156, 160 are operably supplied power by a single power supply cable 150.

While the illustrated embodiment of FIGS. 1-5 includes an internal controller for each UV treatment module 156, 160, in other embodiments, a single controller could be provided that operably communicates with both the cold and hot water flow switches 154, 158 and the LEDs of both of the cold and hot water UV treatment modules 156, 160 such that only a single controller is necessary to control disinfecting both hot and cold water flows.

In a further embodiment, a combination of the two prior control arrangements is provided. In such an arrangement, a master controller could communicate with both controllers 162, 164 as discussed above.

Figure 7:
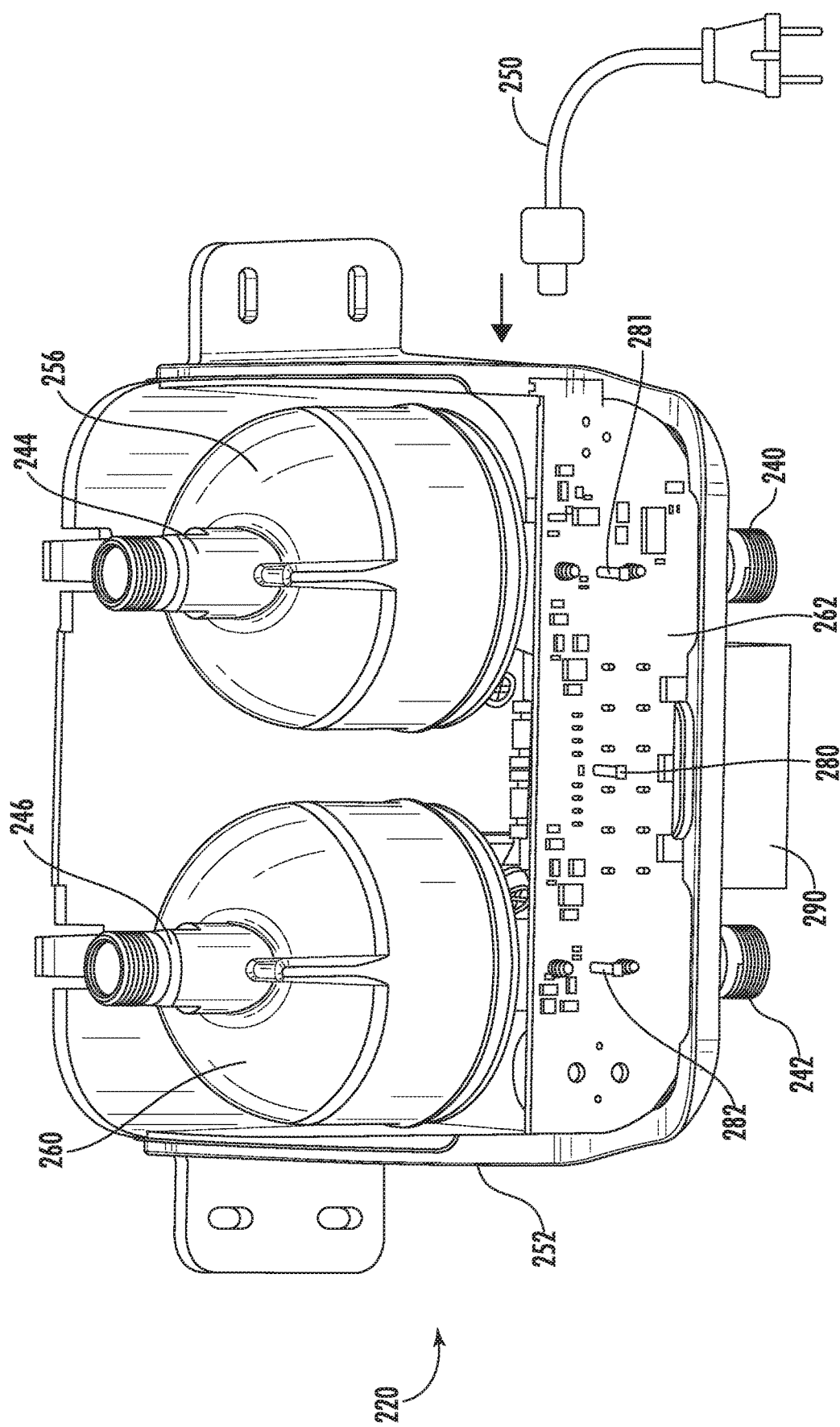

The embodiment of FIG. 7 uses a single control board 262 for controlling all operations of the water disinfecting module 220.

A cold water cooling block 170 is located adjacent to (e.g. attached to or integrated into) the hot water UV treatment module 160 for cooling the LEDs therein. A cold water bleed line 172 fluidly connects the cold water flow path with the cold water cooling block 170 such that a portion of cold water flow may be supplied to the cold water cooling block 170. As the portion of cold water flows through the cold water cooling block 170, the LEDs therein may be cooled.

The cold water cooling block 170 is fluidly connected to the hot water flow path such that after the portion of cold water passes through the cold water bleed line 172 and the cold water cooling block 170, the water flows into the hot water flow path. Preferably, the cold water cooling block is fluidly connected to the hot water flow path upstream of the hot water UV treatment module 160 (e.g. the LEDs thereof) such that the portion of the cold water flow that passes through the cold water cooling block 170 mixes with the hot water flow prior to passing through the hot water UV treatment module 160. Additionally, the cold water bleed line 172 is preferably in fluid communication with the water flow path upstream of the cold water flow switch 154 and the cold water UV treatment module 156. This flow arrangement allows a portion of the cold water to be used for cooling purposes but still allows the cold water to be disinfected, e.g. by the hot water UV treatment module 160 without unnecessarily requiring activation of the cold water UV treatment module 156. More particularly, the portion of cold water that is used for cooling does not flow through the cold water flow switch 154 preventing activation of the cold water UV treatment module 156.

Notably, the cold water bleed line 172 supplies only a very limited flow of cold water to the cold water cooling block 170 so as to appreciably cooling the flow of hot water.

A check valve 174 may be provided to prevent hot water from flowing from the hot water flow path through the cold water bleed line 172 to the cold water flow path.

FIG. 8 illustrates a cold water bleed line 272 for an alternative embodiment. In this embodiment, a separate cold water cooling block is not required. Cold water simply flows into the hot water UV treatment module 260 from bleed line 272.

With reference to FIG. 2, the water disinfecting module 120 may include a plurality of LED indicators 180, 182 for providing operational statuses of the disinfecting module 120. In one embodiment, LED 180 is green while LED 182 is red. LED 180 will be active when the water disinfecting module 120 is operating, e.g. when one of the water flow switches 154, 158 senses a corresponding water flow. The red LED 182 will be activated when the end of life of the unit has occurred or is near or alternatively if a fault has been detected. This could be based on a counting of the number of activations of either UV treatment module 156, 160 or an aggregate of activations of both UV treatment modules 156, 160. An alternative time when the red LED 182 could be activated is if a voltage error has been sensed by one of the controllers. For example, if a voltage in the system that is outside of a predetermined appropriate operating range is sensed, the red LED 182 could be activated.

Figure 6:
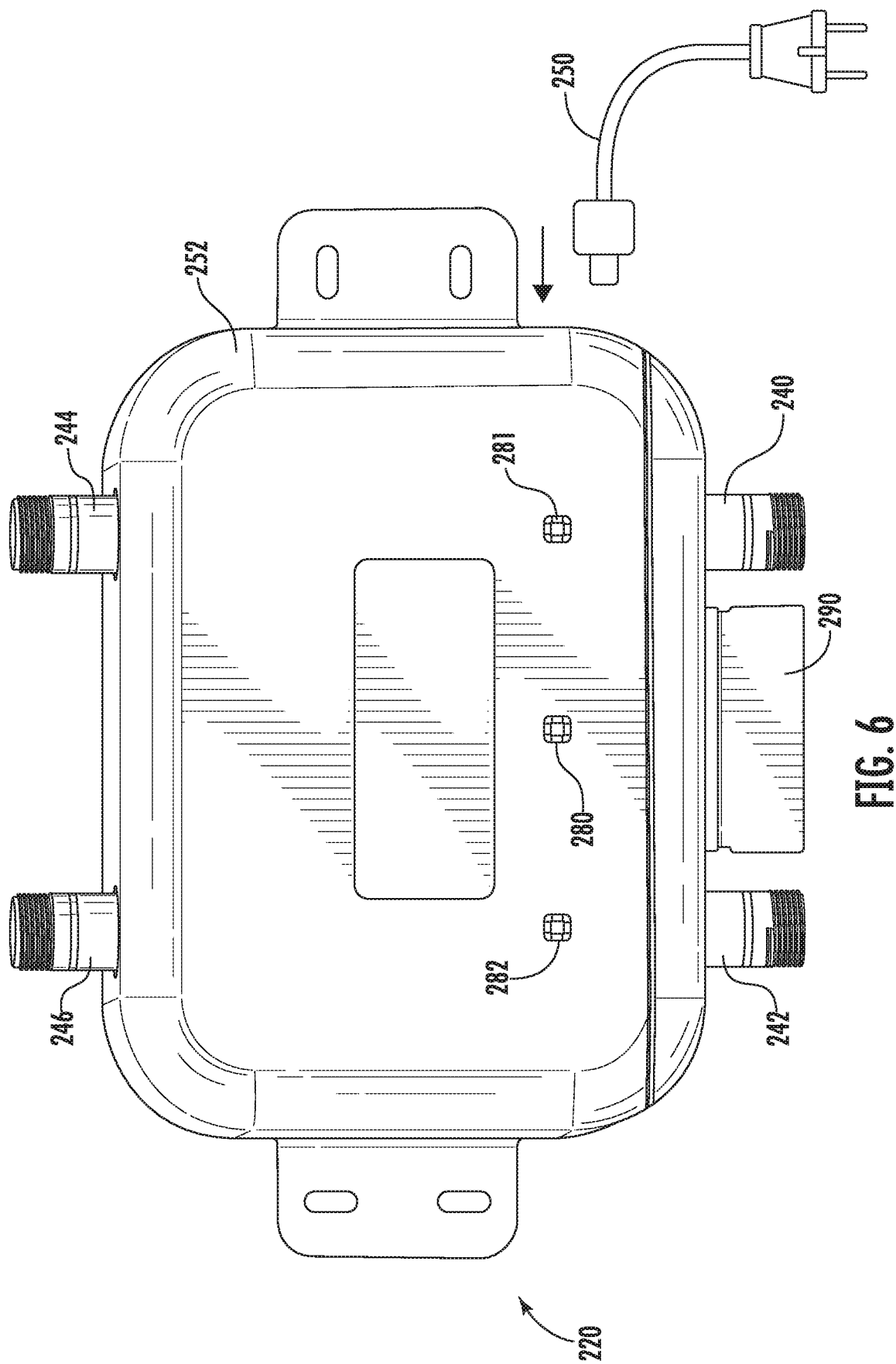

While only two LED indicators are illustrated, more than two could be provided. For instance, in some systems such as the module 220 illustrated in FIG. 6, three LED indicators 280, 281, 282 will be provided. One LED indicator 280 could be dedicated to indicating whether or not power is being provided to the system while the other two LED 281, 282 indicators are dedicated to a corresponding one of the UV treatment modules 256, 260.

In addition to visual communication of the status of the water disinfecting module 120, some embodiments may include audio notifications of the status. While the audio notifications could be both for normal operation and for faults, the audio notifications will typically be problems with the water disinfecting module 120.

In embodiments, an audio alarm 184 is provided in the system. In the illustrated embodiment, the audio alarm 184 is in communication with controllers 162, 164. However, as noted above, if a single controller is used with both of the UV treatment modules 156, 160, then the alarm 184 would only be connected to that controller.

The audio alarm 184 provides a notification to a user even when the device is out-of-sight, e.g. when it is installed under a sink in a cabinet. More particularly, if the water disinfecting module 120 is under a sink in a cabinet, a user may not readily see the LED indicators 180, 182.

In a preferred embodiment, the water disinfecting module 120 is configured, e.g. the controllers 162, 164 are configured, such that the audio alarm only activates when water is flowing through the system. With this configuration, the alarm 184 is activated and an audio notification is generated when a user is likely in the vicinity of the water disinfecting module 120. As such, when an audio notification is to be generated, this audio notification will only be generated when one of the flow switches 154, 158 sense water flow through the system. Alternatively, the audio notification could be sent for a predetermined period of time or for a predetermined period of time after the flow switches 154, 158 sense a no flow condition.

It is noted that the audio notification need not correspond to the water flow that activates one of the flow switches. For example, if there is a problem with the hot water UV treatment module 160, an audio notification could still be sent if the cold water flow switch 154 senses flow of cold water even if the hot water flow switch 158 does not sense a flow of hot water.

While audio alarm 184 is illustrated as a separate component that is connected to controllers 162, 164, in some embodiments the audio alarm 184 could be in the form of two separate alarms. One audio alarm could be directly provided by or connected to each of the two controllers 162, 164. Alternatively, if a single controller is provided that cooperates with both UV treatment modules 156, 160, then a single audio alarm could be connected to or built into the single controller.

The audio alarm could provide different audio notifications for different actions. For instance, the audio alarm 184 could provide different notifications for activation of the different UV treatment modules 156, 160. Alternatively, the audio alarm 184 could provide different audio notifications for different errors, e.g. different audio notifications between errors for the hot and cold water UV treatment modules 156, 160.

It is a feature of embodiments of the present invention that the water disinfecting module 120 is provided as self-contained and unitary unit. More particularly, the housing (frame), hot and cold water flow switches, hot and cold water UV treatment modules and power supply cable are a self-contained and unitary unit. Such a self-contained and unitary unit shall not encompass a plurality of disinfecting modules simply mounted between a faucet and corresponding hot and cold water supplies. Further, the claimed frame shall not include a wall, sink, cabinet or counter top to which the hot and cold water flow switches, hot and cold water UV treatment modules and power supply cable may be mounted.

Housing 152 may have one or more removable panels to allow for servicing of the unit as well as to facilitate assembly.

By providing the water disinfecting module 120 as a self-contained and unitary unit, retrofitting existing faucet or other water supply arrangement installations can be made easy while reducing components (e.g. multiple power supplies and controls for multiple independent UV treatment modules).

Methods of assembling a water supply arrangement are contemplated. More particularly, a method may include supply the water disinfecting module 120 with the cold and hot water inlets 140, 142, cold and hot water outlets 144, 146, cold and hot water UV treatment modules 156, 160, the cold and hot water flow switches 154, 158 and power cord 150 in a fully assembled state mounted to frame 152 to the point of use (e.g. the location of the faucet), prior to performing the following steps: connecting the faucet cold water inlet operably to the cold water outlet of the unit; connecting the faucet hot water inlet operably to the hot water outlet of the unit; connecting a supply of hot water to the hot water inlet of the unit; and connecting a supply of cold water to the cold water inlet of the unit. Again, this method emphasizes the modular nature of the water disinfecting module 120 of providing a hot and cold water disinfecting system.

The method may also include steps of disconnecting the faucet from the hot and cold water supplies prior to the steps of connecting the water disinfecting module 120 between the hot and cold water supplies and the faucet. This again is focused on the beneficial retrofit nature.

Finally, a method may include mounting the water disinfecting module 120 to a sink, a counter, a cabinet, vanity, wall, the floor proximate the faucet to which the disinfected water will be supplied. The method may include simultaneously mounting the cold and hot water inlets 140, 142, cold and hot water outlets 144, 146, cold and hot water UV treatment modules 156, 160, the cold and hot water flow switches 154, 158 and power cord 150 to such a support structure simultaneously by mounting the frame of the water disinfecting module 120 to such a support structure. Again, this would not entail independent mounting of the various components.

In FIG. 5, the water disinfecting module 120 includes a Building Automation System connector 190 (BAS connector 190). This allows the water disinfecting module 120 to be hardwired into a Building Automation System of a building. This will allow for status information of the operation of the water disinfecting module 120 to be communicated to a user via the Building Automation System. Some information that may be communicated will include whether the water disinfecting module 120 is active (e.g. one or both UV treatment modules 156, 160 are active); whether an error or fault has occurred in the water disinfecting module 120 (e.g. if one or both UV treatment modules 156, 160 or other components are working improperly or not at all); whether power is being supplied to the UV treatment module(s) 156, 160; general fault errors; etc.

In some embodiments, the BAS connector 190 is in the form of a 6-pin connector, see e.g. connector 290 of FIG. 8.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A self-contained, unitary water disinfecting module comprising:
    a frame supporting a hot water inlet, a hot water outlet, a cold water inlet and a cold water outlet;
    a hot water flow switch fluidly interposed between the hot water inlet and hot water outlet sensing a hot water flow from the hot water inlet to the hot water outlet, the hot water flow switch supported by and housed within the frame;
    a hot water UV treatment module fluidly interposed between the hot water inlet and hot water outlet, the hot water UV treatment module operably coupled to the hot water flow switch for activation of the hot water UV treatment module upon sensing of the hot water flow, the hot water UV treatment module supported by and housed within the frame;

a cold water flow switch fluidly interposed between the cold water inlet and cold water outlet sensing a cold water flow from the cold water inlet to the cold water outlet, the cold water flow switch supported by and housed within the frame;

a cold water UV treatment module fluidly interposed between the cold water inlet and cold water outlet, the cold water UV treatment module operably coupled to the cold water flow switch for activation of the cold water UV treatment module upon sensing of the cold water flow, the cold water UV treatment module supported by and housed within the frame.

2. The self-contained, unitary water disinfecting module of claim 1, wherein the frame is a housing having an internal cavity with the hot and cold water flow switches and hot and cold water UV treatment modules being located within the internal cavity.

3. The self-contained, unitary water disinfecting module of claim 2, further comprising a controller operably coupling the hot water flow switch with the hot water UV treatment module to activate the hot water UV treatment module upon sensing the flow of hot water, the controller operably coupling the cold water flow switch with the cold water UV treatment module to activate the cold water UV treatment module upon sensing the flow of cold water, the controller supported by the housing and located within the internal cavity.

4. The self-contained, unitary water disinfecting module of claim 1, wherein:
a cold water flow path extends between the cold water inlet and cold water outlet;
a hot water flow path extends between the hot water inlet and hot water outlet; and further comprising:
a cold water cooling block adjacent the hot water UV treatment module for cooling UV LEDS within the UV treatment module; and
a cold water bleed line fluidly connecting the cold water flow path with the cold water cooling block such that a portion of the cold water flow is supplied to the cold water cooling block, the cold water cooling block is fluidly connected to the hot water flow path such that after the portion of cold water passes through the cold water bleed line and the cold water cooling block, the water flows into the hot water flow path.

5. The self-contained, unitary water disinfecting module of claim 4, wherein the cold water cooling block is fluidly connected to the hot water flow path upstream of the hot water UV treatment module such that the portion of the cold water flow that passes through the cold water cooling block mixes with the hot water flow prior to passing through the hot water UV treatment module.

6. The self-contained, unitary water disinfecting module of claim 5, further comprising a check valve preventing hot water from flowing from the hot water flow path through the cold water bleed line to the cold water flow path.

7. The self-contained, unitary water disinfecting module of claim 2, further comprising a single power supply cable passing into the internal cavity of the housing, power for powering the hot and cold water UV treatment modules being operably provided by the single power supply cable.

8. The self-contained, unitary water disinfecting module of claim 1, further including at least one LED indicator that can be selectively activated to provide an operational state of the water disinfecting module.

9. A water supply arrangement comprising:
a self-contained, unitary water disinfecting module of claim 1;
a faucet comprising:
a faucet cold water inlet operably coupled to the cold water outlet of the water disinfecting module;
a faucet hot water inlet operably coupled to the hot water outlet of the water disinfecting module;
a faucet outlet operably fluidly connected to the faucet hot and cold water inlets; and
one or more valves operably interposed between the faucet cold water inlet, faucet hot water inlet, and faucet outlet for controlling the flows of hot and cold water from the faucet cold and hot water inlets to the faucet outlet.

10. A method of assembling the water supply arrangement of claim 9, comprising:
providing the self-contained, unitary water disinfecting module as a unit in a fully assembled state, prior to performing the following steps:
connecting the faucet cold water inlet operably to the cold water outlet of the unit;
connecting the faucet hot water inlet operably to the hot water outlet of the unit;
connecting a supply of hot water to the hot water inlet of the unit; and
connecting a supply of cold water to the cold water inlet of the unit.

11. The method of claim 10, further comprising:
simultaneously mounting the hot and cold water flow switches, hot and cold UV treatment modules to a support structure by mounting the frame to the support structure.

12. The self-contained, unitary water disinfecting module of claim 1, further comprising an alarm, the alarm providing a signal regarding an operational state of one of the hot water UV treatment module or the cold water UV treatment module.

13. The self-contained, unitary water disinfecting module of claim 12, wherein the alarm is an audio alarm that produces a signal that is an audio notification, wherein the audio alarm only produces an audio notification when at least one of the hot water flow switch or cold water flow switch senses a corresponding water flow.

* * * * *